United States Patent
Wu et al.

(10) Patent No.: US 12,166,356 B2
(45) Date of Patent: Dec. 10, 2024

(54) CONTROLLING A POWER PLANT COMPRISING WIND TURBINES DURING GRID FREQUENCY DEVIATION

(71) Applicant: VESTAS WIND SYSTEMS A/S, Aarhus N (DK)

(72) Inventors: Dan Wu, Virum (DK); Rubin Panni, Aarhus C (DK); Henrik Møller, Egå (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 20 days.

(21) Appl. No.: 18/252,874

(22) PCT Filed: Oct. 19, 2021

(86) PCT No.: PCT/DK2021/050311
§ 371 (c)(1),
(2) Date: May 12, 2023

(87) PCT Pub. No.: WO2022/100802
PCT Pub. Date: May 19, 2022

(65) Prior Publication Data
US 2024/0014663 A1 Jan. 11, 2024

(30) Foreign Application Priority Data
Nov. 13, 2020 (DK) .............. PA 2020 70752

(51) Int. Cl.
*H02J 3/38* (2006.01)
*F03D 7/02* (2006.01)
(Continued)

(52) U.S. Cl.
CPC ............ *H02J 3/381* (2013.01); *F03D 7/0284* (2013.01); *F03D 7/048* (2013.01); *H02J 3/241* (2020.01);
(Continued)

(58) Field of Classification Search
CPC ........ H02J 3/381; H02J 3/241; H02J 2300/28; H02J 2300/40; F03D 7/0284; F03D 7/048;
(Continued)

(56) References Cited

U.S. PATENT DOCUMENTS

| 8,688,286 B2* | 4/2014 | Nelson | H02J 3/381 |
| | | | 700/297 |
| 8,803,351 B2* | 8/2014 | Dalsgaard | F03D 7/042 |
| | | | 290/55 |

(Continued)

FOREIGN PATENT DOCUMENTS

| EP | 2393179 A2 | 12/2011 |
| EP | 3007298 A1 | 4/2016 |
| WO | 2019209701 A1 | 10/2019 |

OTHER PUBLICATIONS

PCT, Notification of Transmittal of the International Search Report and the Written Opinion of the International Searching Authority, or the Declaration for Application PCT/DK2021/050311 dated Jan. 20, 2022.

(Continued)

*Primary Examiner* — Pedro J Cuevas
(74) *Attorney, Agent, or Firm* — Patterson + Sheridan, LLP

(57) ABSTRACT

The invention relates to a method for controlling a power plant during an event which requires a change of the power produced by the power plant, wherein the power plant comprises a plurality of power generating units including at least one wind turbine generator, the method comprises determining the power reference dependent on an available power, changing the power reference to a modified power reference by a power variation in response to detecting a first event, memorizing a power level relating to the actual power production at a time occurrence of the first event, setting a (Continued)

maximum power limit to the memorized power level, limiting the modified power reference to the maximum power limit, and controlling the power produced by the wind turbines in accordance with the limited modified power reference.

16 Claims, 4 Drawing Sheets

(51) Int. Cl.
    *F03D 7/04*     (2006.01)
    *H02J 3/24*     (2006.01)

(52) U.S. Cl.
    CPC . *F05B 2270/1033* (2013.01); *F05B 2270/107* (2013.01); *F05B 2270/337* (2013.01); *H02J 2300/24* (2020.01); *H02J 2300/28* (2020.01); *H02J 2300/40* (2020.01)

(58) Field of Classification Search
    CPC ....... F05B 2270/1033; F05B 2270/337; Y02E 10/56; Y02E 10/76; Y02E 10/72
    See application file for complete search history.

(56) References Cited

U.S. PATENT DOCUMENTS

| | | | |
|---|---|---|---|
| 9,222,466 B2* | 12/2015 | Tarnowski | F03D 9/257 |
| 9,935,462 B2* | 4/2018 | Li | H02J 3/32 |
| 10,865,774 B2* | 12/2020 | Hald | F03D 9/257 |
| 11,632,065 B2* | 4/2023 | Howard | H02P 9/02 363/131 |
| 11,962,262 B2* | 4/2024 | Nielsen | F03D 9/25 |
| 2013/0041517 A1* | 2/2013 | Nelson | H02J 3/381 700/292 |
| 2013/0161955 A1* | 6/2013 | Dalsgaard | F03D 7/0292 290/55 |
| 2015/0137519 A1 | 5/2015 | Tarnowski | |
| 2015/0159627 A1 | 6/2015 | Nielsen et al. | |
| 2017/0214321 A1* | 7/2017 | Li | H02J 3/38 |
| 2019/0003456 A1 | 1/2019 | Garcia et al. | |
| 2019/0170120 A1* | 6/2019 | Hald | F03D 9/257 |
| 2019/0338752 A1 | 11/2019 | Yu et al. | |
| 2020/0052628 A1 | 2/2020 | Busker et al. | |
| 2020/0136540 A1 | 4/2020 | Brombach | |
| 2022/0085740 A1* | 3/2022 | Nielsen | F03D 7/0284 |
| 2022/0255323 A1* | 8/2022 | Mendizabal Abasolo | G06Q 10/06315 |
| 2022/0385065 A1* | 12/2022 | Wei | H02J 3/466 |
| 2023/0052292 A1* | 2/2023 | Howard | H02P 9/02 |
| 2023/0187942 A1* | 6/2023 | Knobloch | G05B 19/042 700/295 |
| 2024/0077059 A1* | 3/2024 | Strunz | F03D 7/02 |
| 2024/0113527 A1* | 4/2024 | Ratz | H02J 3/381 |
| 2024/0175422 A1* | 5/2024 | Egedal | F03D 9/19 |

OTHER PUBLICATIONS

Danish Patent and Trademark Office, 1st Technical Examination of Application PA 2020 70752 dated Apr. 22, 2021.

* cited by examiner

CONTROLLING A POWER PLANT COMPRISING WIND TURBINES DURING GRID FREQUENCY DEVIATION

FIELD OF THE INVENTION

The invention relates to control of a power plant comprising a plurality of power generating units, particularly power plants which has one or more wind turbines and, particularly such control for handling grid frequency faults such as over frequency faults.

BACKGROUND OF THE INVENTION

During over frequency events, the power plant may be requested to react to the frequency event by reducing the power production according to the given power reduction. In a given control mode of the wind turbines they are controlled to produced power according to the available wind power. Accordingly, a wind gust can lead to an increase of the power production, even though the power reference to the power plant has been reduced by said given power reduction.

Accordingly, it is a problem that changes in the available wind power can lead to an increase in the wind power during an over frequency event where the power plant is requested to decrease its power production. The present invention has been devised to solve this problem.

SUMMARY

It is an object of the invention to improve control of power plants to alleviate one the above mentioned problems, and therefore to provide a method which provides improved control of power plants comprising wind turbines during a grid frequency fault such as an over frequency event.

In a first aspect of the invention, a method for controlling a power plant during an event which requires a change of the power produced by the power plant is provided, wherein the power plant comprises a plurality of power generating units including at least one wind turbine generator, wherein the power plant is connected to an electrical power grid for supplying power from the power generating units to the electrical power grid, and wherein the power plant is controlled to produce power according to a power reference, the method comprises determining the power reference dependent on an available power, changing the power reference to a modified power reference by a power variation in response to detecting a first event, memorizing a power level, wherein the memorized power level is obtained based on an obtained power level relating to the actual power production at a time of the detection of the first event, setting a power limit to the memorized power level, limiting the modified power reference to the power limit, and controlling the power produced by the wind turbines in accordance with the limited modified power reference.

The event which requires a change of the power produced by the power plant may be a grid frequency event such as a situation where the grid frequency becomes too high or too low, but the event could also be triggered by other changes relating to the power grid or the power plant such as operational conditions of the wind turbines.

Advantageously, by memorizing a power level such as the produced power or the available power at the time of detection of the first event and limiting the modified power reference during the period of time between the first and second event, it is guaranteed that unintended changes of the power production does not worsen the situation that led to the occurrence of the first event.

For example, in case of an over frequency event, the power plant may support the grid by reducing the power production. In this case a maximum power limit is set to ensure that the power production does not exceed the limit e.g. due to an increase of the available power.

In case of an under frequency event, the power plant may support the grid by increasing the power production. In this case a minimum power limit is set to ensure, or at least attempt, that the power production does not decrease below the limit e.g. due to a decrease of the available power or due to other conditions.

According to an embodiment, the method comprises
detecting a second event at a time succeeding the first event, and
in response to detecting the second event, gradually changing the modified power reference towards the available power over a period of time.

The gradual change may be achieved according to a predetermined function such as a ramping function, in contrast to instantaneous changing the power reference or change the power reference as a step change.

According to an embodiment, the method comprises, in response to the detection of the second event, removing the power limit. Thus, when the grid event is over, the, power limit is removed before the modified power reference is ramped towards the available power.

According to an embodiment, a rate of changing the modified power reference is dependent on an input variable. Advantageously, the input variable may relate to an actual grid frequency. Thereby, the ramp rate may be set dependent on the deviation between the actual grid frequency and the nominal grid frequency.

According to an embodiment, the memorized power level is equal or substantially equal to the actual power production at the time of the detection of the first event, alternatively is equal or substantially equal to the actual power production at the time of the detection of the first event subtracted by the power variation. Therefore, the memorized power level is based on the production power or available power at the time when the first event occurs.

According to an embodiment, the changing of the power reference to the modified power reference comprises reducing the power reference by the power variation.

According to an embodiment, the first event is a grid frequency event occurring when the grid frequency deviates from the nominal grid frequency by a predetermined amount.

A second aspect of the invention relates to a central controller for controlling power production of a power plant which comprises a plurality of power generating units including at least one wind turbine generator, where the power plant is connected to an electrical power grid for supplying power from the power generating units to the electrical power grid, where the power plant is controlled to produce power according to a power reference, and where the central controller is arranged to perform the method according to the first aspect.

A third aspect of the invention relates to a power plant which comprises a plurality of power generating units including at least one wind turbine generator and the central controller according to second aspect.

A fourth aspect of the invention relates to a computer program product comprising software code adapted to control a power plant when executed on a data processing system, the computer program product being adapted to perform the method of the first aspect.

In general, the various aspects and embodiments of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
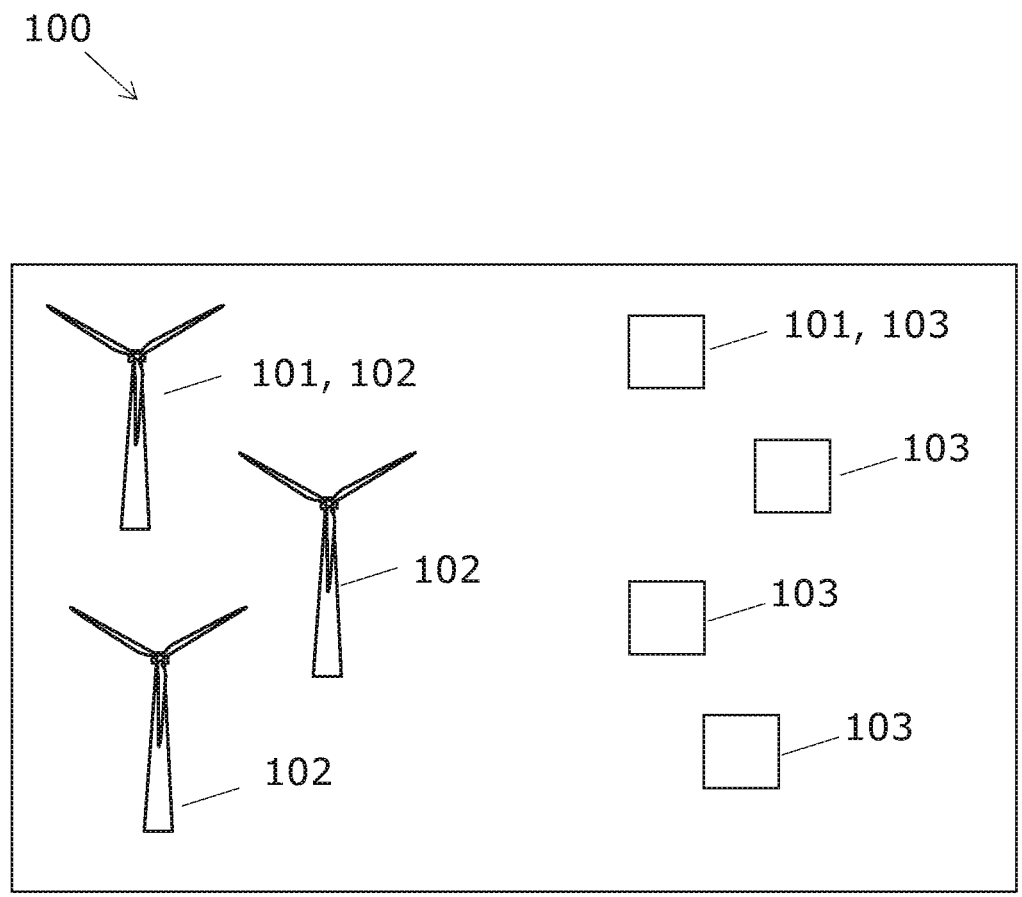
FIG. 1 shows a power plant including a plurality of power generating units and wind turbines.
Figure 1:
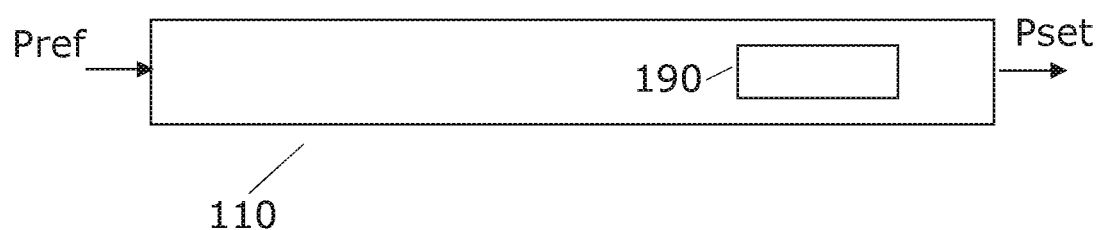

FIG. 1 shows a power plant 100 which comprises a plurality of power generating units 101 such as wind turbines. The power plant 100 may be a renewable power plant comprising only renewable power generating units. In general, the power generating units 101 may consist of different types of power generating units, e.g. different types of renewable power generating units such as solar power units 103 (e.g. photovoltaic solar panels) and wind turbines. According to an embodiment, at least one of the power producing units 101 of the power plant 100 is a wind turbine. The power plant 100 may comprise at least three power generating units 101 of the same or different types, i.e. a mix, of different types of power generating units. For example, the power plant 100 may consist only of wind turbines 102 and in this case at least three wind turbines 102. In another example, the power plant 100 comprises at least two wind turbines 102 and at least one or two other power generating units 101.

The power plant is connectable with an electrical power grid (not shown) for supplying power from the power generating units 101 to the electrical power grid.

The power plant 100 is controlled by a central controller 110. The central controller 110 is arranged to control power generation from the power generating units 101 according to a power plant reference Pref which defines the desired power to be supplied to the grid from the power plant 100. Furthermore, the central controller is arranged to dispatch power set-points Pset to the power generating units, i.e. individual power set-points to each power generating unit 101, or at least the wind turbines 102, which sets the desired power productions of the individual units. The power set-points Pset may be determined by the central controller 110 dependent on the power plant reference Pref so that the sum of power set-points Pset corresponds to the power plant reference Pref.

The central controller 110 may in addition be configured to control the power plant's reactive power production, grid frequency control and/or other functions 190 such as determining a maximal allowed power production value Pmax for the power plant.

Thus, an objective of the central controller 110 is to ensure that the demanded power (e.g. from the Transmission System Operator (TSO)) is delivered, this applies both to increases and decreases in the power plant reference, Pref.

The wind turbine 101 may comprise a tower and a rotor with at least one rotor blade, such as three blades. The rotor is connected to a nacelle which is mounted on top of the tower and being adapted to drive a generator situated inside the nacelle. The rotor is rotatable by action of the wind. The wind induced rotational energy of the rotor blades is transferred via a shaft to the generator. Thus, the wind turbine is capable of converting kinetic energy of the wind into mechanical energy by means of the rotor blades and, subsequently, into electric power by means of the generator. The generator may include a power converter for converting the generator AC power into a DC power and a power inverter for converting the DC power into an AC power to be injected into the electrical power grid.

The generator of the wind turbine 102, or other power generating unit 101, is controllable to produce power corresponding to the power set-point Pset provided by the central controller 110. For wind turbines, the output power may be adjusted according to the power set-point by adjusting the pitch of the rotor blades or by controlling the power converter to adjust the power production. Similar adjustment possibilities exist for other power generating units 101.

The available power Pava_i of a wind turbine 102 can be determined based on the current wind speed and other parameters limiting the power production. For example, the available power Paval_i may be defined as the maximum possible power output of a wind turbine under the given wind conditions. Thus, the available power will be close to the power output according to the power optimised power curve of a specific turbine. The power curve used herein is understood as the power Coefficient (Cp) optimised power curve for the specific turbine. In other words, the power curve represents the maximum power output of a turbine under normal operation as a function of the wind speed.

The available power Pava of the power plant 100 may be determined based on the sum of available power levels of each power generating unit 101. Particularly, the available power Pava of the wind turbines 102 of the power plant 100 may be determined as the sum of the available power levels Pava_i of the wind turbines 102. Accordingly, the available power Pava or the available wind power Pava defines an estimate for the expected future available power. For a power plant 100 comprising a combination of solar power units 103 and wind turbines 102, the available power Pava therefore represents an estimate of the future solar and wind energy. Alternatively, in a power plant 100 comprising wind turbines 102, optionally in combination with solar power units 103, the available power may be an available wind power Pava representing an amount of the future wind energy.

The power plant 100 may be configured to determine the power reference Pref dependent on an available power Pava, e.g. by setting the power reference Pref equal to the determined available power Pava in order to achieve a maximum power production. In other modes, the power reference Pref may be determined in other ways. For example, the power reference Pref may be curtailed to a maximum power level.

Figure 2A:
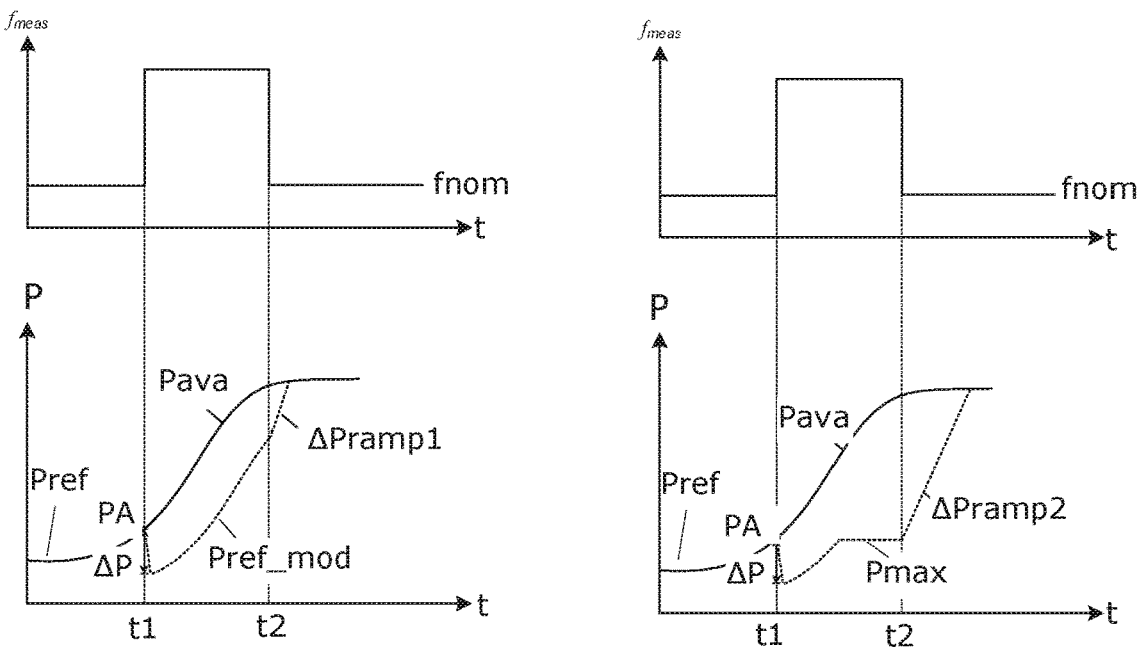
FIGS. 2A-2B shows in the upper graphs to the left and right grid over frequency events and graphs for the available power and changes in the power reference.

FIG. 2A shows in the upper graphs to the left and right, a grid frequency event where the grid frequency has increased by an amount relative to the nominal grid frequency fnom during the period t1-t2.

The frequency fault starting at t1, which could be an over frequency as shown, alternatively an under frequency, is referred to herein as a first event. The first event may be trigged by the detection of the grid frequency exceeding a given threshold such as the threshold of a frequency dead band. Similarly, a second event at time t2 may be triggered by the detection of the grid frequency returning to a frequency within the dead band or other frequency threshold thereby indicating that nominal grid frequency has been reestablished or an acceptable grid frequency has been achieved.

The frequency fault starting at t1, which could be an over frequency as shown, alternatively an under frequency, or other event which demands a change in the power reference Pref is referred to herein as a first event.

The central controller 110 or a control system thereof is configured to determine a power variation $\Delta P$ in response to the start of the frequency fault, i.e. in response to the first event.

In case of an over frequency, e.g. where the grid frequency exceeds an upper threshold value of a given dead band frequency range, the power plant 100 can help stabilizing or restoring the grid frequency by reducing its power production according to the power variation $\Delta P$. Similarly, in case of an under frequency, where the grid frequency has decreased below the nominal frequency, e.g. below a lower threshold of the dead band frequency range, the power plant 100 can help stabilizing or restoring the grid frequency by increasing its power production according to the power variation $\Delta P$.

Thus, in response to detecting the first event the power plant 110, such as the central controller 110, is configured to change the power reference Pref to a modified power reference Pref_mod by a power variation $\Delta P$.

Since the power reference Pref is determined from the available power Pava, in an example, the modified power reference Pref_mod is determined as a modification of the available power Pava such as Pref_mod=Pava-$\Delta P$. It is noted that $\Delta P$ could also be determined as a negative quantity and therefore added to Pava in response to an over frequency event.

FIG. 2A shows in an example in the lower graph to the left, that the power reference Pref is changed from Pref=Pava to Pref=Pref_mod=Pava-$\Delta P$. Herein the power reference Pref being modified according to $\Delta P$ is referred to as the modified power reference Pref_mod. At time t2, the nominal grid frequency has been reestablished and the power reference Pref is ramped from the modified power reference Pref_mod=Pava-$\Delta P$ back to the non-modified power reference Pref=Pava.

This situation is not desirable since at some time after t1, the modified power reference Pref_mod increases above the power level PA which was produced at t1 when the over frequency event started. Accordingly, the power plant 100 does not support the over frequency event by reducing the power production.

FIG. 2A, in the lower graph to the right, illustrates an embodiment wherein the modified power reference Pref_mod is limited to a maximum power limit Pmax.

In this example, the maximum power limit Pmax is achieved by memorizing the power level corresponding to the produced active power at the time of detection of the first event, i.e. when the grid frequency fault is detected. Thus, in this example the memorized power level Pmem is set to the produced power PA (which corresponds to the available power Pava at t1 which was produced at t1). The memorized power level Pmem may be stored in a memory of the central controller 110 or other memory of the power plant 100. The produced power such at the power PA produced at t1 may be obtained from measurements or estimations. In practice the produced power at t1, or other corresponding power such as the available power at t1, may be used for setting the memorized power level Pmem at t1.

Then the maximum power limit Pmax is set to the memorized power level Pmem so that the modified power reference Pref_mod is limited to Pmax in case the available power Pava should exceed Pmax.

The memorized power level Pmem need not be identical with the power production level at time t1, but may be set at a value different, i.e. smaller or larger dependent on whether the first event is an over or under frequency event. Thus, in general the memorized power level Pmem may be obtained based on the actual power production Pmeas at the time of the detection of the first event, or based on the available power production Pava at time t1, or other corresponding power level. For example, the memorized power level Pmem may be set to the available power Pava at time t1 modified by the determined power variation $\Delta P$, i.e. Pmem=Pava-$\Delta P$.

Based on the limited modified power reference, i.e. the modified power reference which is limited in case the modified power reference exceeds the maximum power limit Pmax, the central controller 110 or other controller of the power plant 100 controls the power production of the wind turbines.

FIG. 2A, in the lower graphs to the left and right, shows that the power reference is ramped from the value of the modified power reference Pref_mod in response to the second event at t2 to the available power Pava. FIG. 2A, in the lower graph to the right, shows ramping according to solutions described in connection with FIGS. 3A and 3B.

Figure 2B:
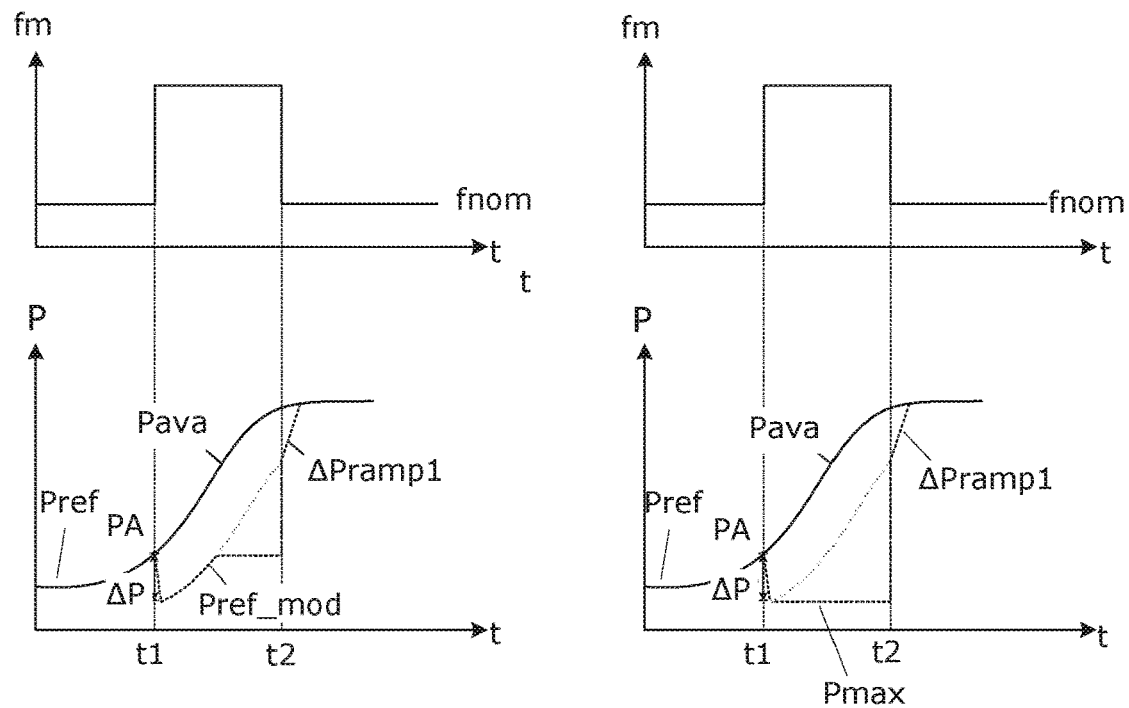

FIG. 2B shows in the upper and lower graphs to the left, the same over frequency situation as in FIG. 2A, where the memorized power level Pmem is set to PA, the produced power level at t1.

Similarly, FIG. 2B shows, in the upper and lower graphs to the right, the same over frequency situation as in FIG. 2A, but where the memorized power level Pmem is set to the produced power PA at t1 modified with the power variation $\Delta P$, i.e. Pmax=Pmem=PA-$\Delta P$.

FIG. 2B shows, in the upper and lower graphs to the left, the normal situation where the central controller 110 is not configured to ramp the power reference Pref at the time t2 of the second event back to the available power Pava, but instantaneously releases the limitation of the modified power reference Pref_mod, being limited according to the memorized power level Pmem. Therefore, in situations where the power level Pava-$\Delta P$ has been limited according to Pmax, the power reference instantaneously changes from the limited modified power reference Pref_mod given at the time before the occurrence of the second event to the unlimited modified power reference Pref_mod at the time after the second event, and then the modified power reference Pref_mod is ramped to the available power Pref=Pava according to the ramp rate $\Delta$Pramp1 applied to power variations $\Delta P$.

The instantaneous change of the power reference may cause undesirable loads of the wind turbine.

According to an embodiment, the central controller 110 is configured to gradually change the modified and limited power reference Pref_mod towards the available power Pava over a period of time. Thus, in situations where the modified power reference Pref_mod has been limited according to the maximum power level Pmax, the power reference is ramped from the limited power reference to the available power Pava.

Further, in response to the detection of the second event at time t2 the central controller 110 is configured to remove the maximum power limit Pmax or to disable the limit function 320.

The central controller 110 may be configured to determine the a rate of changing the modified power reference Pref_mod towards the available power Pava dependent on an input variable. For example, the input variable may be related to the actual grid frequency fm so that if the grid frequency is within a first threshold the rate is given by a first rate value, and if the grid frequency is within a second threshold the rate is given by a second rate value, wherein the second threshold is closer to the nominal grid frequency fnom than the first threshold and the first rate value is lower than the second rate value.

Figure 3A:
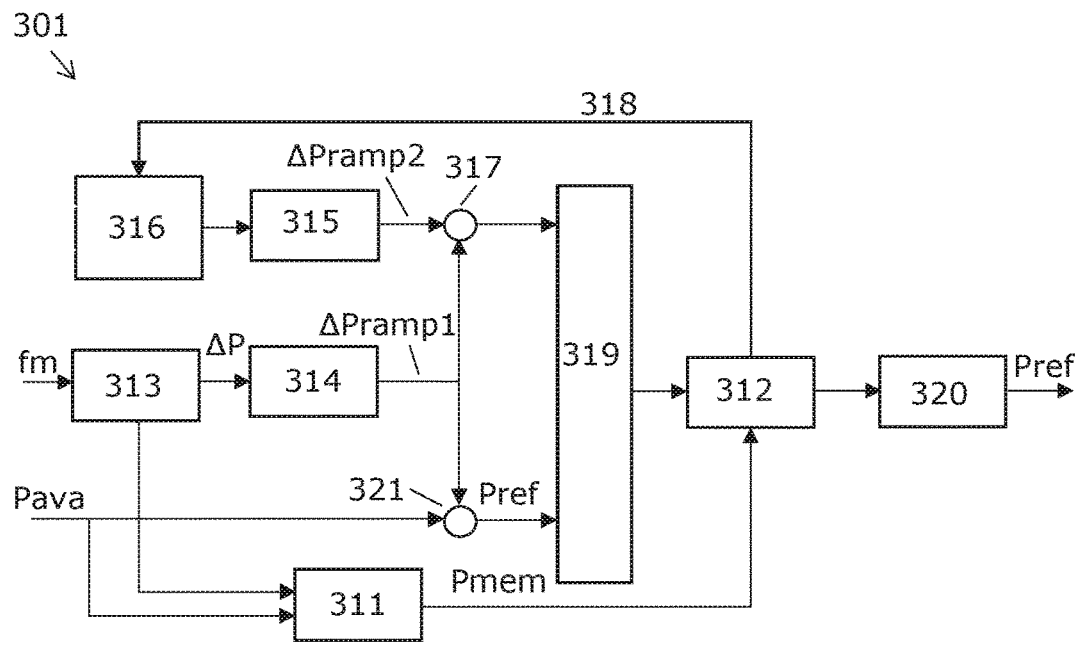
FIGS. 3A-3B shows examples of a control system for determining and adapting the power reference dependent on events, such as grid frequency events.

FIG. 3A shows an example of a control system 301 of the central controller 110 which is arranged to determine the modified power reference Pref_mod according to the examples and embodiments described herein.

The control system 301 comprises a latch function arranged to memorize the power level of the actual power production Pmeas or equivalently the available power Pava and latch said power level at the time t1 of the detection of the first event. In this example, the latch function is embodied by the memorizer 311 and the latch 312, where the memorizer 311 is updated on a continuous basis with the power production levels Pmeas or Pava when the grid frequency fm is within an allowed range such as a dead band range as indicated by the input signal from the P-f function 313. If the input signal from the P-f function 313 changes due to the grid frequency event where the grid frequency fm exceeds the frequency threshold of the dead band, the memorizer 311 stops updating the memorized power level Pmem so that Pmem is frozen to the value of Pmeas or Pava at the occurrence of the first event.

The memorizer 311 and the latch 312 could also be been combined into a single unit.

The P-f function 313 determines the power variation $\Delta P$ dependent on a deviation between the measured grid frequency fm and frequency threshold of the frequency dead band or the nominal grid frequency fnom, e.g. by use of function which relates $\Delta P$ with the grid frequency fm or grid frequency deviation.

The minimum function 319 selects the signal from either the output of the summing function 317 or the summing function 321 which as has the smallest value, such as the smallest average value over a given period.

Any changes of the of power variation $\Delta P$, such as a change from zero to a given $\Delta P$ value, or vice versa, is rate limited by a first rate limiter 314. The rate of the first rate limiter 314 is shown as $\Delta Pramp1$ in FIGS. 2A and 2B.

As shown, the power reference Pref or equivalently the modified power reference Pref_mod is determined as Pref=Pref_mod=Pava−$\Delta P$. Thus, as long as there is no grid frequency fault, the power reference Pref is determined as Pava since $\Delta P$ is equal to zero. When a non-zero power variation $\Delta P$ is generated due to the frequency fault, the modified power reference Pref_mod is determined as Pava−$\Delta P$.

At the occurrence of the second event when the grid frequency recovers at a time t2, the value of Pmem is no longer frozen to the value of Pmeas or Pava at the occurrence of the first event, but is released to follow the available power Pava. Therefore, if the available power Pava differs from—e.g. is greater than—the memorized power level Pmem, a step change of the power reference Pref is unavoidable.

To address this problem, the control system 301 is configured with a second rate limiter 315 and a rate initialization function 316 arranged to ramp the power reference Pref from the memorized power level Pmem=Pmax. The function of the rate initialization function 316 is:

Just before an occurrence of the second event at t2, the output of the summing function 317 is Px+$\Delta P$, where Px is an arbitrary output of the second rate limiter 315. This output need to be set to a suitable value.

Therefore, at the occurrence of the second event, the initialization function 316 is triggered by a change of the signal 318 from the latch function 312 to set its output value to the memorized power level Pmem+$\Delta P$. Thus, at time t2 the output of the second rate limiter 315 is Pmem+$\Delta P$ or equally Pmax+$\Delta P$.

Accordingly, at t2, the output of the summing function 317 is Pmem+$\Delta P$−$\Delta P$=Pmem.

In the situations where Pmem is smaller than Pava at t2 when the second event has been detected, the minimum function 319 will select the output from the summing function 317 which will be ramp rate limited according to the ramp rate $\Delta Pramp2$ of the second rate limiter 315. The effect of the solution involving the second rate limiter 315 is shown in FIG. 2A, to the right.

The limiter 320 implements the limitation of the modified power reference Pref_mod to the maximum power limit Pmax.

Figure 3B:
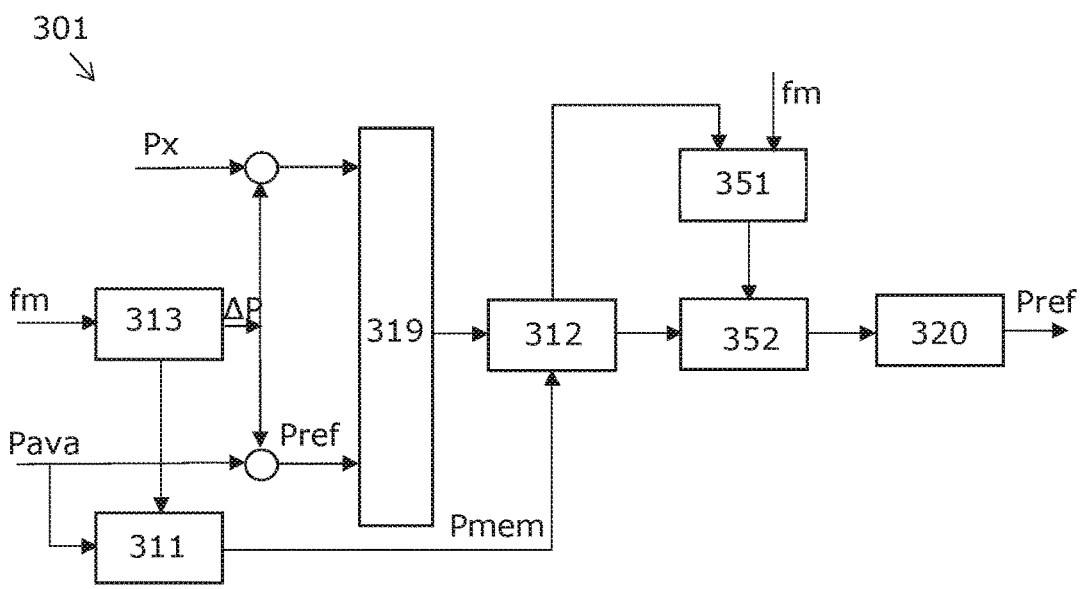

FIG. 3B shows an example of an alternative control system 301 arranged to determine the modified power reference Pref_mod and to provide a ramping function to gradually change the modified power reference Pref_mod towards the available power Pava over a period of time in the situation where Pmem is smaller than Pava at t2.

Elements of FIGS. 3B and 3A have the same or corresponding function.

In comparison with FIG. 3A, the alternative control system 201 comprises a state machine 351 arranged to control the rate limiter 352 dependent on whether the latch function embodied by the memorizer 311 and the latch 312 latches the memorized power level Pmem. For example, in the situation where the latch is released in response to the second event at time=t2 and the grid frequency fm is within the acceptable dead band, the state machine instructs the rate limiter 352 to apply the ramp rate $\Delta Pramp2$ so that, in situations where Pmem is smaller than Pava at t2, the power reference Pref outputted from the minimum function 319 will be ramp rate limited according to the ramp rate $\Delta Pramp2$ of the rate limiter 352 towards the available power Pava.

The state machine 351 may be configured to determine the ramp rate to be applied by the rate limiter 352 dependent on an input variable such as the actual grid frequency fm and thereby modify the ramp rate dependent on the deviation between the grid frequency fm and the nominal grid frequency fnom.

Similarly, the first and second rate limiter 314, 315 may be configured to determine the ramp rate to be applied dependent on an input variable.

Figure 4:
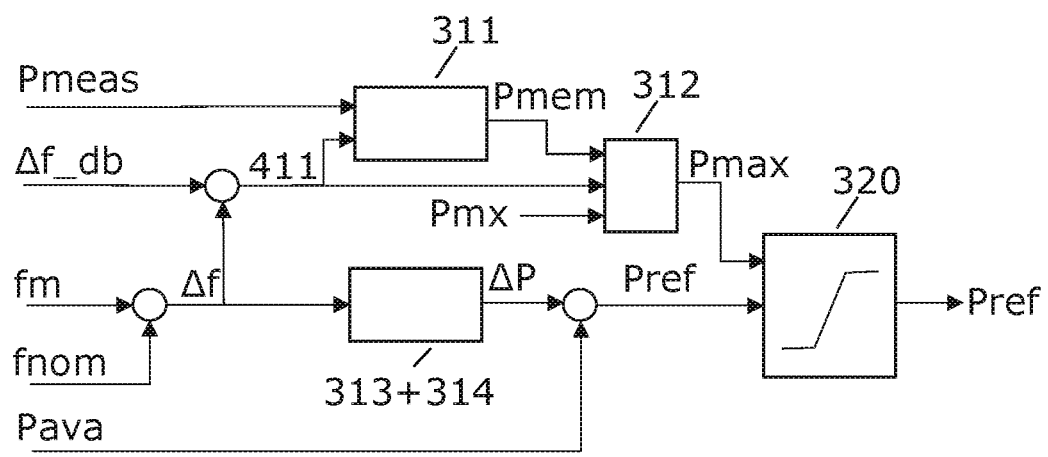
FIG. 4 shows an example of a solution for memorizing a power level at the occurrence of the first event and a latch for switching between the memorized power level and a another power level such as a predetermined power level and providing one of said power levels to a limit function.

FIG. 4 shows a possible implementation of the latch function as embodied by the memorizer 311 and the latch 312. The P-f function 313 and the rate limiter 314, combined as a single element, determines the power variation $\Delta P$, based on the grid frequency variation $\Delta f = fm - fnom$. The power reference $Pref = Pava - \Delta f$ is supplied to the limiter 320. The maximum power limit Pmax of the limiter 320 is set based on the memorized power level Pmem, or an arbitrary Pmx. The latch 312 determines its output Pmax to equal Pmem if the frequency deviation signal 411 indicates that the actual frequency deviation $\Delta f$ is greater than the allowed frequency dead band $\Delta f\_db$, otherwise to equal Pmx if the actual frequency deviation $\Delta f$ is smaller than the allowed frequency dead band $\Delta f\_db$. The memorized power level Pmem is frozen by the memorizer 311 dependent on the frequency deviation signal 411, so that Pmem is fixed to the measured power production Pmeas or Pava at the occurrence of the first event, e.g. when the frequency deviation $\Delta f$ exceeds the allowed frequency dead band $\Delta f\_db$.

The invention claimed is:

1. A method for controlling a power plant during an event which requires a change of power produced by the power plant, wherein the power plant comprises a plurality of power generating units including at least one wind turbine, wherein the power plant is connected to an electrical power grid for supplying power from the power generating units to the electrical power grid, and wherein the power plant is controlled to produce power according to a power reference, the method comprises:
   determining the power reference dependent on an available power,
   changing the power reference to a modified power reference by a power variation in response to detecting a first event,
   memorizing a power level, wherein the memorized power level is obtained based on an obtained power level relating to an actual power production at a time of the detection of the first event,
   setting a power limit to the memorized power level,
   limiting the modified power reference to the power limit, and
   controlling the power produced by the at least one wind turbine in accordance with the limited modified power reference.

2. A method according to claim 1, further comprising:
   detecting a second event at a time succeeding the first event,
   in response to detecting the second event, gradually changing the modified power reference towards the available power over a period of time.

3. A method according to claim 2, further comprising:
   in response to the detection of the second event, removing the power limit.

4. A method according to claim 2, wherein a rate of changing the modified power reference is dependent on an input variable.

5. A method according to claim 4, wherein the input variable relates to an actual grid frequency.

6. A method according to claim 2, wherein the second event is a grid frequency event occurring when a grid frequency has returned to an allowed grid frequency.

7. A method according to claim 1, wherein the memorized power level is equal or substantially equal to the actual power production at the time of the detection of the first event, alternatively is equal or substantially equal to the actual power production at the time of the detection of the first event subtracted by the power variation.

8. A method according to claim 1, wherein the power limit is a maximum power limit.

9. A method according to claim 1, wherein the changing of the power reference to the modified power reference comprises reducing the power reference by the power variation.

10. A method according to claim 1, wherein the first event is a grid frequency event occurring when a grid frequency deviates from a nominal grid frequency by a predetermined amount.

11. A method according to claim 1, wherein the first event is an over frequency event occurring when a grid frequency exceeds a nominal grid frequency by a predetermined amount.

12. A central controller for controlling power production of a power plant which comprises a plurality of power generating units including at least one wind turbine, where the power plant is connected to an electrical power grid for supplying power from the power generating units to the electrical power grid, where the power plant is controlled to produce power according to a power reference, and where the central controller is arranged to perform an operation for controlling the power plant during an event which requires a change of the power produced by the power plant, the operation comprising:
   determining the power reference dependent on an available power,
   changing the power reference to a modified power reference by a power variation in response to detecting a first event,
   memorizing a power level, wherein the memorized power level is obtained based on an obtained power level relating to an actual power production at a time of the detection of the first event,
   setting a power limit to the memorized power level,
   limiting the modified power reference to the power limit, and
   controlling the power produced by the at least one wind turbine in accordance with the limited modified power reference.

13. A power plant which comprises a plurality of power generating units including at least one wind turbine and a central controller for controlling power production of the power plant, where the power plant is connected to an electrical power grid for supplying power from the power generating units to the electrical power grid, where the power plant is controlled to produce power according to a power reference, and where the central controller is arranged to perform an operation for controlling the power plant during an event which requires a change of the power produced by the power plant, the operation comprising:
   determining the power reference dependent on an available power,
   changing the power reference to a modified power reference by a power variation in response to detecting a first event,
   memorizing a power level, wherein the memorized power level is obtained based on an obtained power level relating to an actual power production at a time of the detection of the first event,
   setting a power limit to the memorized power level,
   limiting the modified power reference to the power limit, and
   controlling the power produced by the at least one wind turbine in accordance with the limited modified power reference.

14. A computer program product comprising software code adapted to perform an operation controlling a power plant when executed on a data processing system, wherein the power plant comprises a plurality of power generating units including at least one wind turbine, where the power plant is connected to an electrical power grid for supplying power from the power generating units to the electrical power grid, where the power plant is controlled to produce power according to a power reference; the operation comprising:
- determining the power reference dependent on an available power,
- changing the power reference to a modified power reference by a power variation in response to detecting a first event,
- memorizing a power level, wherein the memorized power level is obtained based on an obtained power level relating to an actual power production at a time of the detection of the first event,
- setting a power limit to the memorized power level,
- limiting the modified power reference to the power limit, and
- controlling the power produced by the at least one wind turbine in accordance with the limited modified power reference.

15. A computer program product according to claim 14, further comprising:
- detecting a second event at a time succeeding the first event,
- in response to detecting the second event, gradually changing the modified power reference towards the available power over a period of time.

16. A computer program product according to claim 15, further comprising:
- in response to the detection of the second event, removing the power limit.

* * * * *